July 16, 1946.　　　D. A. WALLACE ET AL　　　2,404,330
POWER TRANSMISSION
Filed Sept. 2, 1941　　　5 Sheets-Sheet 1

INVENTORS.
David A. Wallace,
Edward C. Lee,
BY
ATTORNEYS.

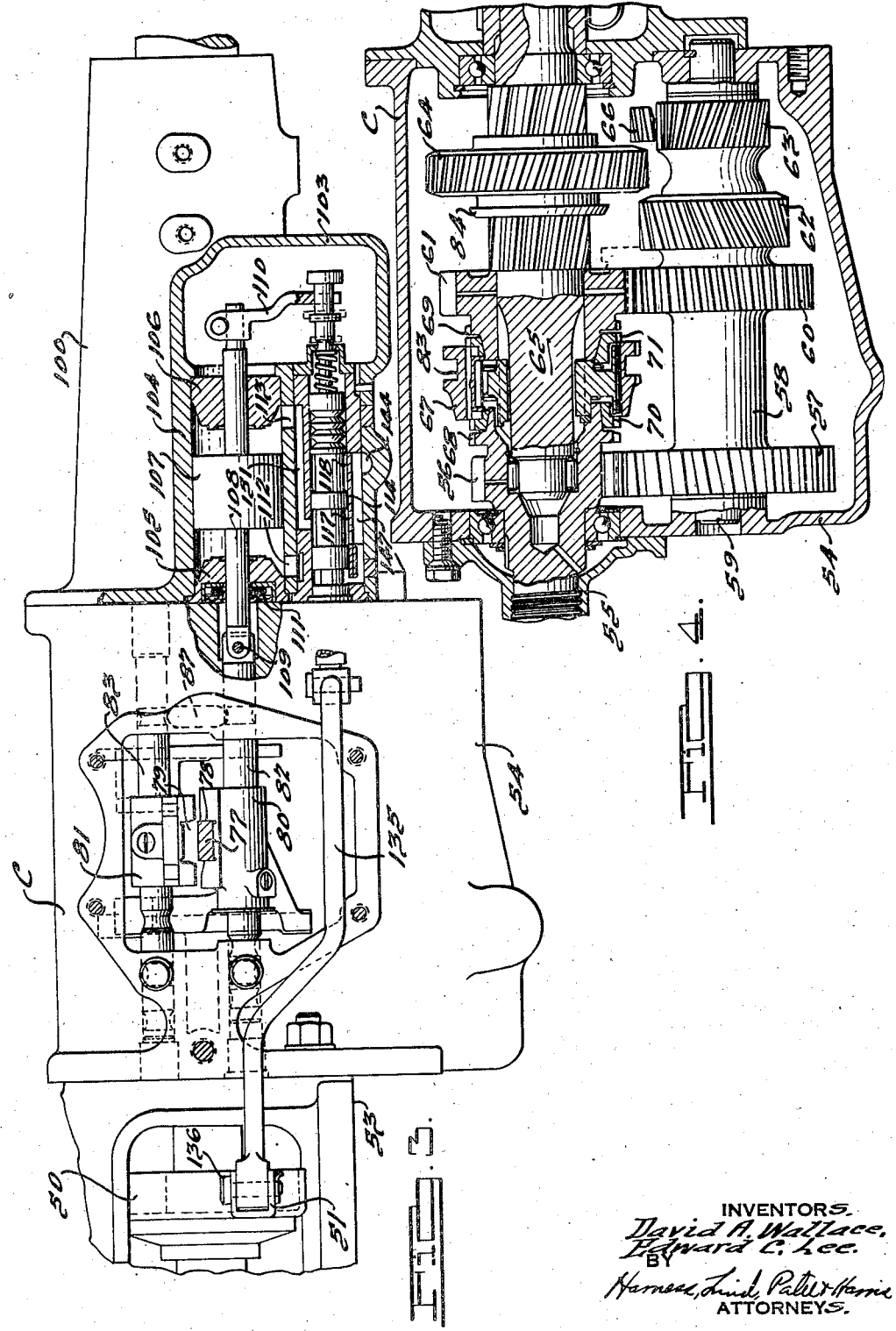

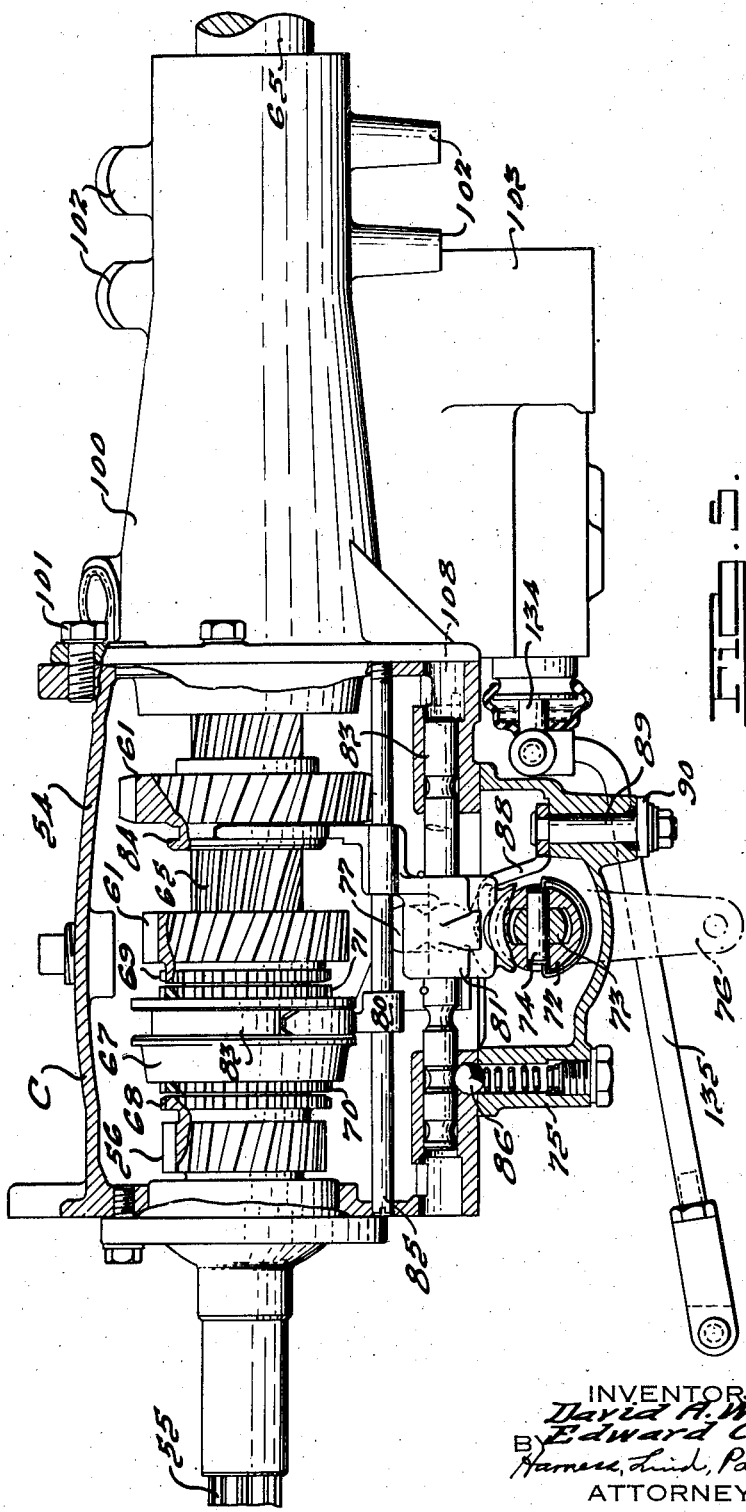

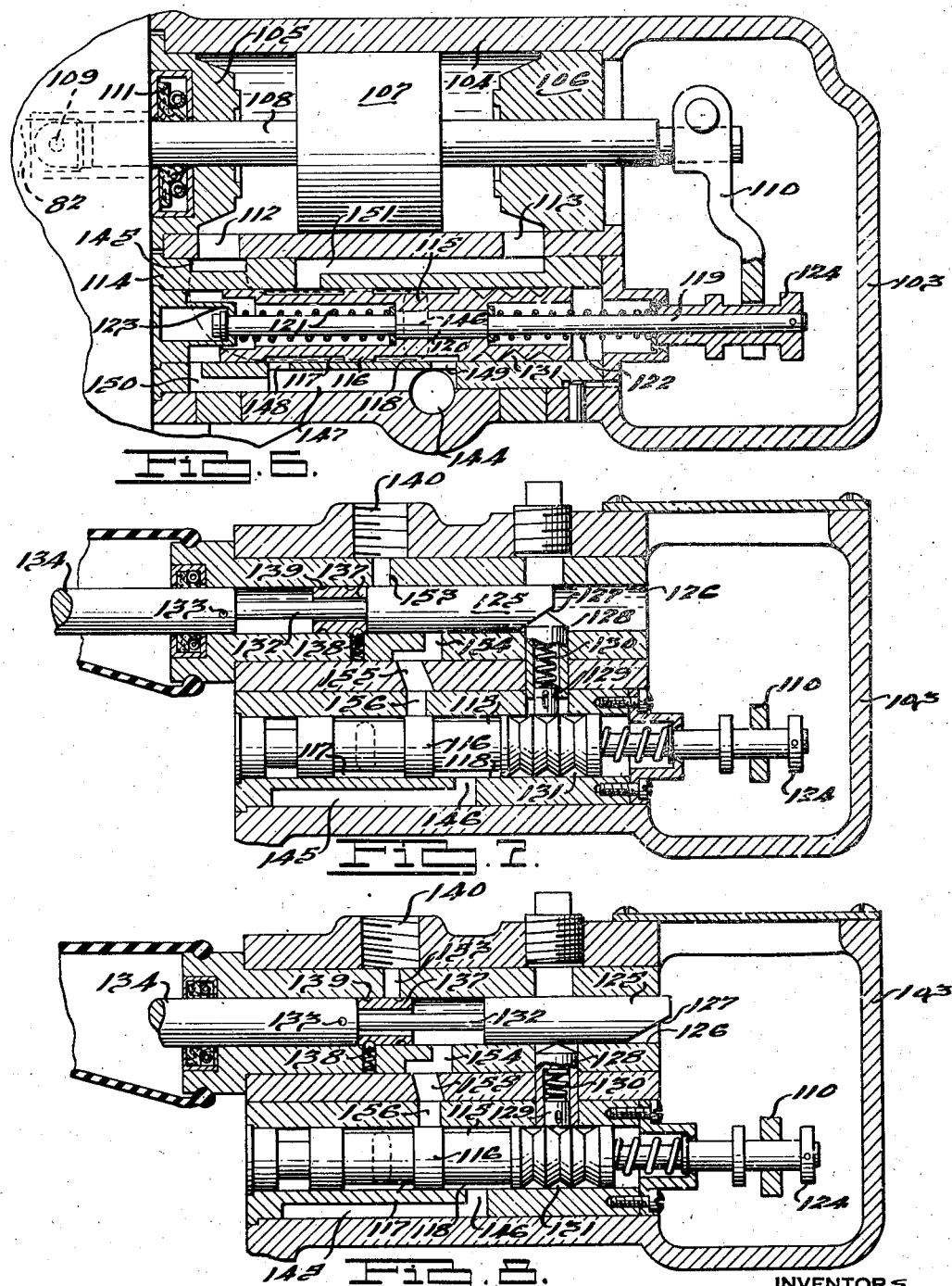

July 16, 1946. D. A. WALLACE ET AL 2,404,330
POWER TRANSMISSION
Filed Sept. 2, 1941 5 Sheets-Sheet 5

INVENTORS.
David A. Wallace
Edward C. Lee.
BY
ATTORNEYS.

Patented July 16, 1946

2,404,330

UNITED STATES PATENT OFFICE 2,404,330

POWER TRANSMISSION

David A. Wallace and Edward C. Lee, Detroit, Mich., assignors to Chrysler Corporation, Highland Park, Mich., a corporation of Delaware Application September 2, 1941, Serial No. 409,210

11 Claims. (Cl. 192—3.5)

This invention relates to improvements in power transmissions, particularly in the shifting mechanism for such transmissions.

It is the main object of the invention to provide a simple and economically manufactured power shift apparatus for conventional types of vehicle change speed transmissions.

During recent years various forms of automatic and semi-automatic power transmissions have come into vogue for motor vehicles. For the most part these transmissions have been costly to manufacture and have required considerable reorganization of other parts of the vehicle besides requiring the learning of a somewhat different driving technique on the part of the driver.

The power shifting apparatus disclosed and claimed herein is adapted for ready attachment to vehicles equipped with conventional manually operable change speed transmissions either as a factory installation or as a service accessory. The regular engine oil pressure system is used to supply operating oil pressure and the transmission control is not disturbed except that shifting of gears between second and high speed ratio is performed by power means in response to ordinary operation of the clutch pedal.

A further object therefor is to provide a power shifting apparatus operable to shift the transmission gears in response to operation of the vehicle clutch pedal.

Other advantages and objects will become apparent from the following description. In the drawings accompanying said description.

Fig. 3 is a combined side elevation and sectional view in an enlarged scale of the transmission showing the control mechanism thereof, this view being taken as indicated by the line 3—3 in Fig. 2.

Fig. 4 is a sectional view of the transmission showing the gears.

Fig. 5 is a plan view of the transmission, the casing being partially cut away to illustrate details of the shift mechanism.

Fig. 6 is an enlarged sectional view of the hydraulic shifting mechanism, the parts being shown in neutral position with the clutch engaged.

Fig. 7 is a sectional view taken along the line 7—7 of Fig. 2 and showing the valve operating mechanism, the positions of the parts corresponding to Fig. 6.

Fig. 8 is a sectional view of the Fig. 7 mechanism with the clutch fully released.

Figure 1:
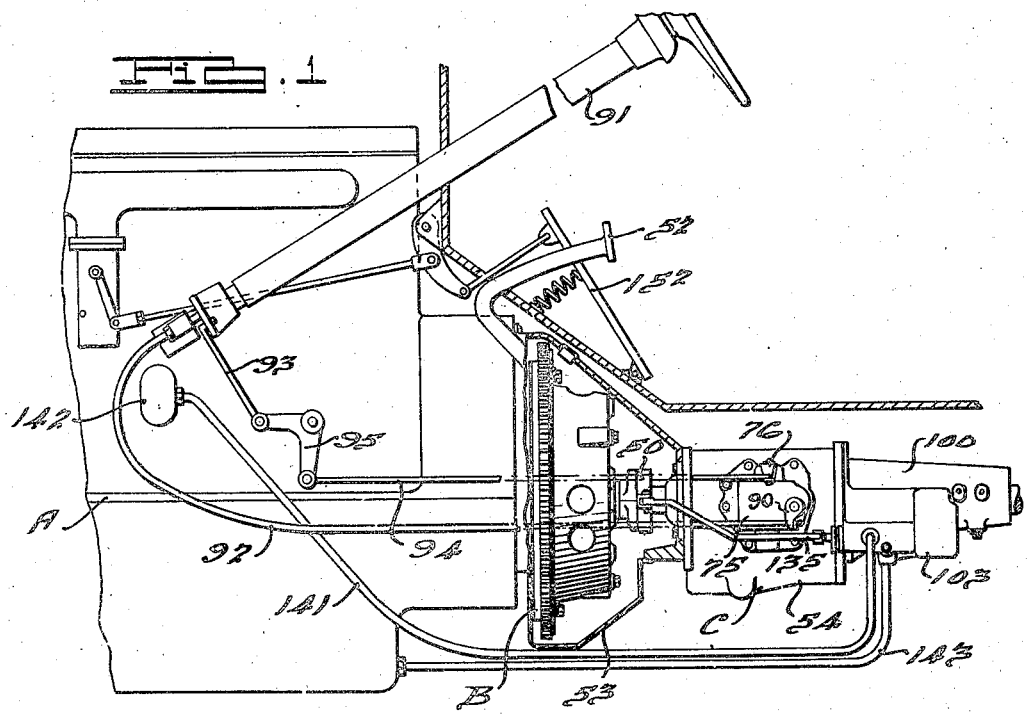
Fig. 1 is a partial side elevation of an automobile power plant and change speed transmission embodying the present invention.
Figure 2:
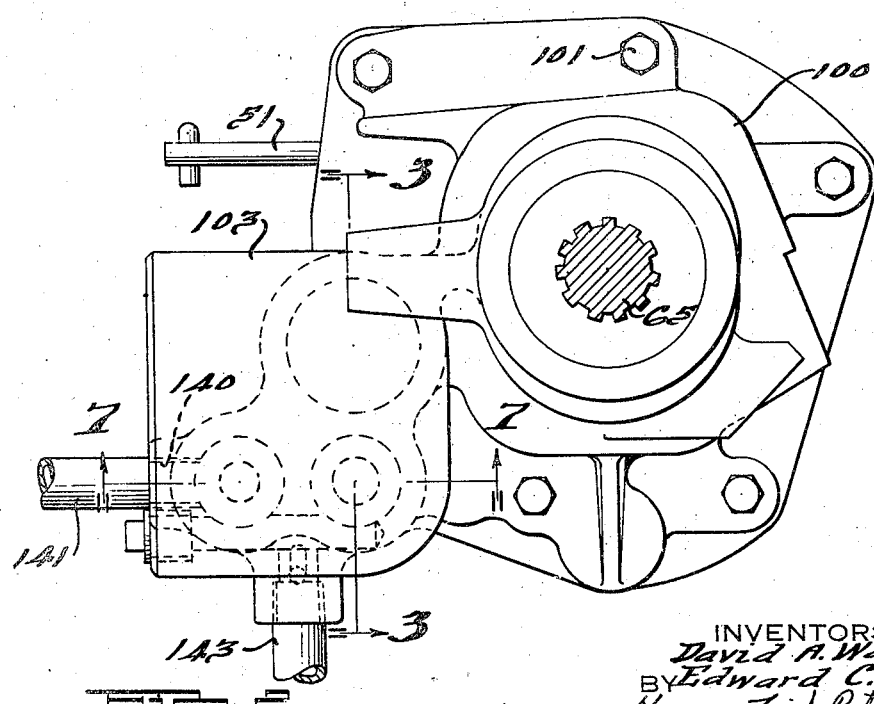
Fig. 2 is a rear end elevation of the transmission.

Referring to Figs. 1 to 5, it may be seen that we have illustrated our invention as applied to a motor vehicle having an engine A, a releasable friction clutch B and a manually shiftable transmission C. The clutch B may be of any commercially available type and is releasable by means of a release mechanism 50, the fork 51 thereof being connected to the clutch pedal 52 by any suitable linkage such as, for example, that illustrated in Auten Patent No. 2,232,302, issued February 18, 1941.

The clutch is enclosed in a housing 53 mounted in the block of the engine A and a housing or casing 54 for the transmission C is fastened to the rear end thereof. A shaft 55 drivingly connects the clutch B with the transmission. This shaft has a drive pinion 56 formed thereon which meshes with a gear 57 of a countershaft cluster 58 carried by a countershaft 59. The cluster includes also a gear 60 disposed in mesh with the second speed drive gear 61, a low speed gear 62 and a reverse gear 63. A shiftable gear 64 splined on the mainshaft 65 is adapted to be shifted into mesh with the gear 62 to provide low speed ratio drive, or with a reverse idler gear 66 to provide reverse drive; the gear 66 being carried by its own countershaft in permanent mesh with the gear 63.

A shiftable clutch sleeve 67 is splined on the shaft 65 and is adapted to be engaged with the clutch teeth 68 of pinion 56 for direct drive, or with the clutch teeth 69 of gear 61 for second speed ratio drive. Suitable blocker synchronizers 70 and 71 are provided to prevent clashing of teeth as is common in the art.

The clutch sleeve 67 and gear 64 are shiftable by a manually operated remote shift mechanism which comprises a trunnion member 72 rockably carried by a rockshaft 73 by means of a pin 74. The rockshaft is rotatably carried by a casing cover 75 and extends outwardly therefrom, an operating lever 76 being fixed on its outer end. A shift finger 77 carried by the trunnion 72 is adapted to selectively engage slots 78, 79 formed in shift yokes 80, 81 respectively.

The shift yoke 80 is carried by a rail 82 and has an integral fork portion which engages the shift collar portion 83 of the clutch sleeve 67. The yoke 81 likewise has a fork portion which engages a shift collar 84 formed on the low-reverse gear 61. Both yokes are slidable on a rod 85 and the rails 82, 83 are operatively engaged by the usual detent mechanism 86 and interlock pin 87.

The finger 77 is biased by a spring (not shown) into engagement with the yoke 80 at all times. A selector lever 88 carried by a shaft 89 is adapted for actuation by a lever 90 (Fig. 5) to rock the trunnion 72 on the pin 74 to disengage the finger 77 from the slot 78 in yoke 80 and engage it with the slot 79 in yoke 81 when it is desired to set the transmission for low or reverse drive. For a more detailed description of the shift mechanism reference may be made to the patent of Otto E. Fishburn, Serial No. 332,910, filed May 2, 1940, No. 2,284,191, issued May 26, 1942.

The shift lever 76 and selector lever 90 are actuated by a suitable remote control linkage carried by the vehicle steering column which includes a Bowden cable 92 and shift links 93, 94 connected by bell crank 95. The arrangement is such that the driver operable shift lever (not shown) may be swung about its mounting in two parallel paths of movement, the lower path controlling the yoke 81 and the upper path controlling the yoke 80.

Most motor vehicle manufacturers offer an overdrive transmission as optional equipment and on those models not equipped with overdrive an extension housing is fastened to the rear end of the transmission casing in the space which would ordinarily be occupied by the overdrive gearing and casing. We have modified this extension housing and adapted it for housing the operating parts of our hydraulic shifting mechanism, but it is desired to point out that our invention is not limited in its application to this precise construction.

As will be seen from Figs. 1–5, a housing 100 is secured by bolts 101 to the casing 54. The housing 100 is hollow, the mainshaft 65 extending therethrough, and has means formed thereon, indicated by numeral 102, for mounting the usual propeller shaft brake (not shown). Formed on the housing 100 is a casing 103 which houses the fluid pressure motor and valve mechanism.

The fluid pressure motor comprises a cylinder 104 closed at its forward end by a head 105 and at its rear end by a head 106. Slidable within the cylinder is a piston 107 which carries a piston rod 108. The latter extends forwardly into casing 54 where it is connected by means of a pin 109 with the second-high rail 82, and rearwardly of the head 106 where a valve operating arm 110 is mounted thereon. A suitable packing gland 111 is provided adjacent the forward cylinder head for sealing the cylinder.

The cylinder 104 is ported at 112 and 113 for the admission of fluid under pressure thereby to shift the piston 107 and rail 82.

The valve mechanism for controlling the admission of fluid to the cylinder 104 comprises a ported sleeve 114 having a shrunk fit in the casing 103 below the cylinder 104. Slidably disposed within the sleeve is a plunger 115 having a centrally positioned enlarged portion 116 which separates a pair of chambers 117, 118. A stem 119 is slidable within the plunger 115. This stem has an enlarged central portion 120 which snugly and slidably fits within a bore formed in the plunger for receiving the same.

The valve stem 119 carries a pair of coil springs 121, 122 which are adapted to be compressed between washers 123 suitably positioned in the stem as will presently appear. Fixed in the rear end of the stem is a collar 124 which is engaged by the bifurcated lower end of the valve operating arm 110. The latter is slidable on the collar 124 within the limits permitted by the shoulders thereon as will be clear from the drawing.

Figure 9:
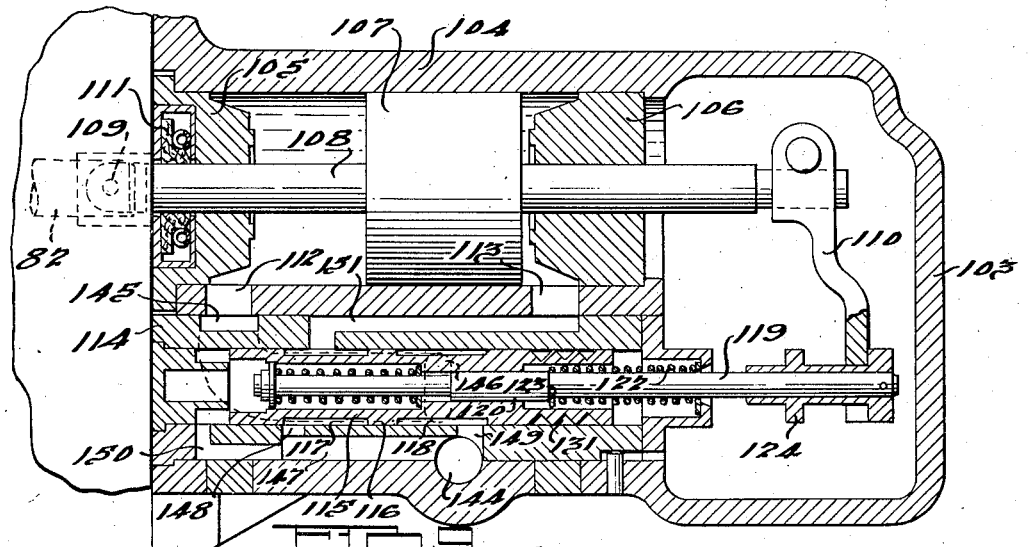
Fig. 9 is a sectional view of the Fig. 6 mechanism, the parts being shown in second speed position with the clutch released.

Disposed outwardly adjacent the valve in the casing 103 is an interlocking mechanism which comprises a plunger 125 slidable in a bore 126. The plunger has a ramped rear portion 127 which engages a plunger 128. The latter has an internal bore in which is carried a detent plunger 129 and a spring 130. The plunger 129 is permitted to move inwardly of the bore of plunger 128 against the spring 130 only when the plunger 125 is in the Fig. 9 position. When the plunger 125 is moved rearwardly of its bore to the position illustrated in Fig. 10, plunger 128 is thrust into its bore compressing spring 130 which prevents yielding of the detent plunger 129. This locks the valve plunger 115 against movement the plunger 129 being always engaged with one of the locking grooves 131 formed in the valve plunger.

Plunger 125 has a forward reduced portion 132 which is fastened by a pin 133 to a rod 134. The latter is in turn operably connected by a link 135 and a pin 136 with the clutch throwout fork 51 (Figs. 3 and 5). The arrangement is such that depression of the pedal 52 to effect release of clutch B will also effect rearward movement of plunger 125 in bore 126 thereby to lock valve plunger 115.

A collar 137 is slidably disposed in the bore 126. This collar is loose on the reduced portion 132 of the plunger 125 but snugly engages the bore. A detent 138 of the well known spring pressed ball type is adapted to engage one or the other of a pair of grooves 139 formed in the collar as will be further explained herein.

The casing 103 has an inlet 140 which is connected by a pipe 141 with the engine oil pump 142. A similar pipe 143 connects the casing outlet or vent port 144 with the crankcase as illustrated in Fig. 1.

The valve sleeve 114 is provided with a passage 145 which connects with the cylinder port 112 and with a port 146 which opens into the sidewall of the cylinder as shown in Fig. 6. The vent passage 144 connects with a passage 147 which is disposed longitudinally of the cylinder and connects with valve sleeve ports 148 and 149. A drain passage 150 opens into the passage 147 for draining the interior of the valve.

The enlarged portion 116 of the valve stem 115 separates two annular valve chambers 117, 118 carried by the stem which chambers are adapted to selectively connect certain of the ports and passages as will presently be made clear.

Figure 11:
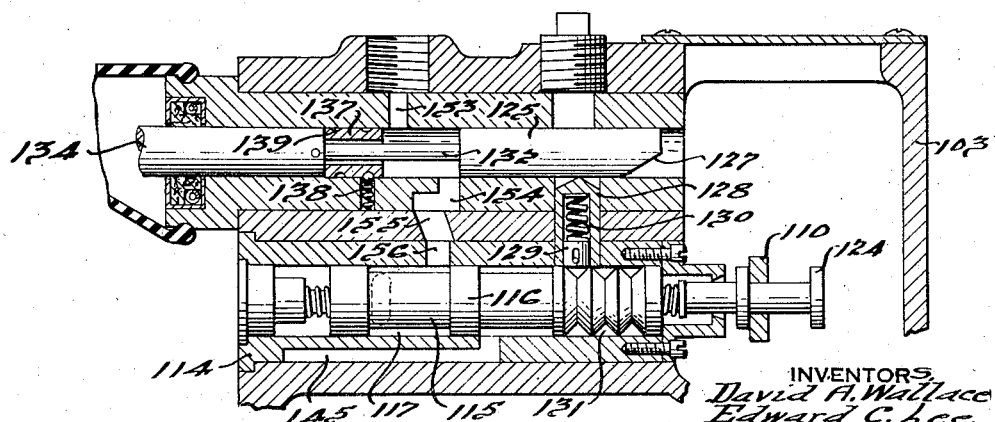
Fig. 11 is a sectional view of the valve operating mechanism with the clutch released to normal release position, the transmission parts being in high speed or direct drive position.

The inlet port 140 is connected with the control valve by passages 153, 154, 155 and 156 when the plunger 125 is moved rearwardly sufficiently to uncover passages 153 and 154, but not sufficiently to move the collar 137. This condition of the plunger is shown in Fig. 11.

Fluid flowing into the valve is blocked by the enlarged portion 116 of the stem 115 when the latter is in neutral position (Figs. 6, 7, and 8). When the stem is in second speed ratio position (Figs. 9 and 10) and the plunger 125 is in clutch released position as in Fig. 11, fluid under pressure flows into valve chamber 117 and thence through passage 151 and cylinder port 113 into cylinder 104 in rear of piston 107 whereupon the piston 107 is thrust forwardly to shift the sleeve 67 to direct drive position. At the same time the forward portion of the cylinder is vented through port 112, passage 145, port 146, chamber 118, port 149 and port 144, vent port 148 being covered by the forward head of the valve stem.

Similarly when the stem 115 is thrust forwardly to high or direct drive position (not illustrated) vent port 149 is covered by the rear head of the stem and chamber 118 is opened to pressure port 156, which is thus connected to the cylinder by way of passage 145. At the same time the rear end of the cylinder is vented through passage 151, chamber 117, port 148 and passage 147.

The operation of the apparatus is as follows: It will be noted that the power actuated shift mechanism is effective for shifting the sleeve 67 only, the low-reverse drive gear 64 being shifted manually in conventional manner.

Let it be assumed that the vehicle is at rest with engine A running and the regular manually operable remote shift control lever in neutral position, the clutch pedal 52 being in clutch engaged position as illustrated in Fig. 1. In order to drive the vehicle forwardly the driver depresses the clutch pedal 52 to the full extent of its travel which action disengages the clutch B and through the action of the link 135 the plunger 125 is thrust rearwardly to the full extent of its travel as illustrated in Fig. 8. Rearward movement of the rod 134 to the position shown in Fig. 8 effects movement of the collar 137 in a rearward direction sufficiently to close the inlet passage 153 thereby preventing the pressure fluid from entering the main control valve. During operation of the vehicle under normal driving conditions, when the power actuating shift mechanism is effective, the clutch 52 is depressed only enough to release the drive through clutch B when shifting by the power means and this movement of the clutch pedal is not sufficient to displace the collar 137 which is retained in the position shown in Fig. 7 by the detent mechanism 138 at all times except when the transmission is shifted manually, under which conditions the clutch pedal is depressed to the full extent of its travel to thereby displace the collar 137 and prevent the pressure fluid from entering the main control valve.

While the clutch pedal 52 is depressed to the full extent of its travel as aforesaid, the transmission remote shift mechanism may be manipulated to shift the gear 64 into mesh with the countershaft cluster gear 62 thereby to set the transmission mechanism for forward travel in low speed ratio upon engagement of clutch B. Inasmuch as the position of gear 64 is controlled by rail 83 the piston 107 of the shifting motor is not disturbed. Release of clutch pedal 52 and depression of the accelerator pedal 152 will now cause the vehicle to be driven forwardly in low speed ratio and when the vehicle has been accelerated to desired speed, shift to second speed ratio may be accomplished manually by depression of the clutch pedal 52 to the full extent of its travel and manipulation of the remote shift mechanism to shift the sleeve 67 rearwardly into mesh with clutch teeth 69. This action effects rearward travel of the piston 107 to the position shown in Fig. 9, which movement of the piston is freely permitted because both ends of the cylinder 104 are vented, the stem 115 of the main control valve being locked in neutral position by plunger 129 as illustrated in Fig. 8.

Movement of the piston rod 108 rearwardly effects corresponding rearward movement of the valve rod 119 through the intermediary of the arm 110 and the collar 124. Inasmuch as the stem 115 is locked against movement by the plunger 129 the stem itself does not move and the springs 121 and 122 are placed under compression.

Figure 10:
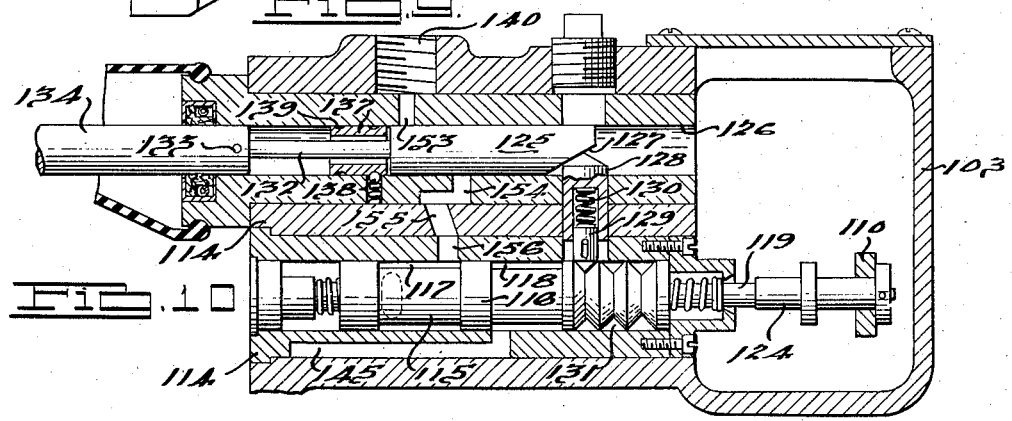
Fig. 10 is a sectional view of the valve operating mechanism, the positions of the parts corresponding to Fig. 9 with the clutch engaged.

Release of the clutch pedal 52 to thereby engage clutch B will now result in the vehicle being driven forwardly in second or intermediate speed ratio and, as soon as the plunger 125 is returned to clutch engaged position, springs 121 and 122 act to thrust the valve stem 115 rearwardly to the position shown in Fig. 10 which action connects the rear end of cylinder 104 with pressure port 156 through the intermediary of chamber 117, passage 151 and port 113, while at the same time the forward end of the cylinder is vented through port 112, passage 145 and chamber 118 which is connected to the vent passage 144 through port 149. So long as the plunger 125 is in clutch engaged position, as illustrated in Fig. 10, there is no pressure on in the cylinder 104 because pressure port 153 is blanked off by the plunger 125.

After acceleration of the vehicle in intermediate speed ratio to predetermined desired speed, shift to high or direct speed ratio is accomplished by power actuation in response to depression of clutch pedal 52 sufficiently to disengage clutch B and move rod 134 rearwardly to the position illustrated in Fig. 11. As soon as plunger 125 is moved rearwardly sufficiently to establish communication between port 153 and passage 154 fluid under pressure flows through passage 155 and port 156 into chamber 117 and as this chamber is connected to the rear end of cylinder 104 piston 107 is immediately thrust forwardly to shift rail 82 and clutch sleeve 67 forwardly to clutch the teeth thereof with clutch teeth 68 thereupon establishing direct drive connection between shafts 55 and 65.

It will be noted that the forward stroke of the piston 107 takes place during release of the clutch, plunger 129 under these circumstances locking the stem against movement which results in springs 121, 122 being placed under compression through movement of the rod 119 forwardly. Release of the clutch pedal will now cause the vehicle to be driven forwardly in direct drive and as soon as the plunger 125 is returned to clutch engaged position thereby releasing detent plunger 128, the stem 115 will be thrust forwardly by the action of the springs 121, 122 to connect the rear end of cylinder 104 to vent passage 144 and connect the forward end of cylinder 104 to pressure port 156 as will be readily understood from the drawing.

Thus it will be seen that the next time that clutch pedal 52 is depressed, piston 107 will be shifted rearwardly of cylinder 104 thereby to effect shift of clutch sleeve 67 back to second speed ratio position, no manual actuation of the shift mechanism being necessary.

It has been found perfectly feasible with proper choice of gear and axle ratios to start the vehicle in second speed ratio; low speed ratio being reserved for emergency starts and for negotiating steep grades, sand, snow, etc. So long as the driver wishes to drive the vehicle forwardly under normal driving conditions shift of the clutch sleeve 67 is entirely automatic in response to operation of clutch pedal 52. For example, when the vehicle is brought to a stop at a traffic light, depression of clutch pedal 52 will result in the sleeve 67 being shifted rearwardly to second speed position preparatory to starting the vehicle in this speed ratio upon re-engagement of the clutch, and as soon as sufficient speed has been obtained depression of clutch pedal 52 will result in the sleeve 67 being shifted to high speed position, the action of the power mechanism being entirely automatic with the valve stem 115 being automatically set for shift of the piston 107 in the opposite direction upon subsequent depression of the clutch pedal.

It will be understood that the clutch pedal must be depressed only sufficiently to establish communication between port 153 and passage 154 during automatic operation of the transmission, full depression of the clutch pedal to the Fig. 8 position being made only when manual manipulation of the transmission is desired. The detent 138 acts to maintain the collar 137 in inoperative position except when the clutch pedal is depressed to its full extent. For this reason it is preferable that the spring controlling detent 138 be made sufficiently strong so that the driver may be able to feel the extra resistance necessary to effect movement of the collar 137. Reverse setting of the transmission is effected in conventional manner by manual manipulation of the remote shift mechanism, the clutch pedal 52 being depressed fully to cut off communication between port 153 and passage 154 while the gear 164 is being shifted into engagement with reverse idler gear 166 as will be readily understood.

It may thus be seen that we have provided a simple and fool-proof power actuated mechanism which may be easily applied to a standard transmission for shifting the same between second speed and high speed positions for normal forward driving. Our improved power shifting mechanism does not interfere with the ordinary manual control of the transmission which may be resorted to at any time, it being necessary only to depress clutch pedal 52 sufficiently to move the collar 137 rearwardly to blank off the pressure port 153 when it is desired to shift either the gear 61 or the clutch sleeve 67 manually.

While but one preferred embodiment of our invention has been illustrated for purposes of disclosure, it will be understood that various changes may be resorted to by those skilled in the art without departing from the principles of our invention.

We claim:

1. In a motor vehicle having an engine, a clutch and a change speed transmission, a pressure fluid actuated motor for controlling said transmission so as to cause the transmission to drive at one speed ratio in one position of the motor and to drive at another speed ratio in another position of the motor; a valve for controlling said motor including leader and follower members so arranged that said leader member may be operated in advance of said follower member, operation of said follower member causing operation of said motor; means operably connecting said leader member with said motor whereby said leader member is operated in response to operation of said motor, and means operably connecting said follower member with said clutch whereby said follower member may be locked against operation incidentally to operation of said clutch.

2. In a motor vehicle having an engine, a clutch and a change speed transmission, a shift member in said transmission adapted to be shifted from neutral to a low speed drive position and to a high speed drive position; a pressure fluid actuated motor for shifting said member including, a reciprocable piston operatively connected to said member so as to cause the transmission to be in the low speed drive position in one position of the piston and to be in the high speed drive position in another position of the piston, a control valve for controlling said motor; means operably interconnecting said piston and said valve whereby said valve is moved to high speed position in response to movement of said piston to low speed position and to low speed position in response to movement of said piston to high speed position; said interconnecting means including a lost motion connection operable to permit movement of said piston in advance of corresponding movement of said valve; and means operable by the driver for locking said valve against movement during movement of said piston.

3. In a motor vehicle having an engine, a clutch and a change speed transmission, a shift member in said transmission adapted to be shifted from neutral to a low speed drive position and to a high speed drive position; a pressure fluid actuated motor for shifting said member including, a reciprocable piston operatively connected to said member so as to cause the transmission to be in the low speed drive position in one position of the piston and to be in the high speed drive position in another position of the piston, a control valve for controlling said motor; means operably interconnecting said piston and said valve whereby said valve is moved to high speed position in response to movement of said piston to low speed position and to low speed position in response to movement of said piston to high speed position; said interconnecting means including a lost motion connection operable to permit movement of said piston in advance of corresponding movement of said valve; and means operable in response to release of said clutch for locking said valve against movement.

4. In a motor vehicle having an engine, a clutch and a change speed transmission, a shift member in said transmission adapted to be shifted from neutral to a low speed drive position and to a high speed drive position; a pressure fluid actuated motor for shifting said member including, a reciprocable piston operatively connected to said member so as to cause the transmission to be in the low speed drive position in one position of the piston and to be in the high speed drive position in another position of the piston, a control valve for controlling said motor; means operably interconnecting said piston and said valve whereby said valve is moved to high speed position in response to movement of said piston to low speed position and to low speed position in response to movement of said piston to high speed position; said interconnecting means including a lost motion connection operable to permit movement of said piston in advance of corresponding movement of said valve; a master valve for controlling admission of pressure fluid to said control valve; and means operable in response to release of said clutch for simultaneously operating said master valve and locking said control valve against movement.

5. In a motor vehicle having an engine, a clutch and a change speed transmission, a shift member in said transmission adapted to be shifted from neutral to a low speed drive position and to a high speed drive position; a pressure fluid actuated motor for shifting said member including, a reciprocable piston operatively connected to said member so as to cause the transmission to be in the low speed drive position in one position of the piston and to be in the high speed drive position in another position of the piston, a control valve for controlling said motor; means operably interconnecting said piston and said valve whereby said valve is moved to high speed position in response to movement of said piston to low speed position and to low speed position in response to movement of said piston to high speed position; said interconnecting means including a lost motion connection operable to permit movement of said piston in advance of corresponding movement of said valve; and means connecting said control valve with said clutch operable to lock said control valve against movement when said clutch is released.

6. In a motor vehicle having an engine, a clutch and a change speed transmission, a shift member in said transmission adapted to be shifted from neutral to a low speed drive position and to a high speed drive position; a pressure fluid actuated motor for shifting said member including, a reciprocable piston operatively connected to said member, a control valve for controlling said motor; means operably interconnecting said piston and said valve whereby said valve is moved to high speed position in response to movement of said piston to low speed position and to low speed position in response to movement of said piston to high speed position; said interconnecting means including a yieldable member operable to permit movement of said piston in advance of corresponding movement of said control valve; a master valve operably connected with said clutch for controlling admission of pressure fluid to said control valve, said master valve being constructed and arranged such that it is closed when said clutch is engaged and open when said clutch is released; and means interconnecting said valves for preventing movement of said control valve when said master valve is open.

7. In a motor vehicle having an engine, a clutch and a change speed transmission, a shift member in said transmission adapted to be shifted from neutral to a low speed drive position and to a high speed drive position; a pressure fluid actuated motor for shifting said member including, a reciprocable piston operatively connected to said member, a control valve for controlling said motor; means operably interconnecting said piston and said valve whereby said valve is moved to high speed position in response to movement of said piston to low speed position and to low speed position in response to movement of said piston to high speed position; said interconnecting means including a yieldable member operable to permit movement of said piston in advance of corresponding movement of said control valve; a master valve operably connected with said clutch for controlling admission of pressure fluid to said control valve, said master valve being constructed and arranged such that it is closed when said clutch is engaged and open when said clutch is released; lock means operably associated with said control valve for locking the same against movement during movement of said piston, and means for operating said lock means in response to release of said clutch.

8. In a motor vehicle having an engine, a clutch and a change speed transmission, a shift member in said transmission adapted to be shifted from neutral to a low speed drive position and to a high speed drive position; a pressure fluid actuated motor for shifting said member including, a reciprocable piston operatively connected to said member, a control valve for controlling said motor; means operably interconnecting said piston and said valve whereby said valve is moved to high speed position in response to movement of said piston to low speed position and to low speed position in response to movement of said piston to high speed position; a master valve for controlling admission of pressure fluid to said control valve including inlet and outlet ports and a plunger operably connected to said clutch for operation when said clutch is released to establish communication between said ports; a pedal for controlling said clutch and master valve, said pedal having a normal range of movement for releasing said clutch and opening said valve and a further range of movement overtravelling said normal range and means operable in response to operation of said pedal in said overtravelling range for cutting off communication between said ports.

9. In the combination set forth in claim 8, means adapted for operation by the master valve plunger when the same is moved to open position for locking said control valve against movement.

10. In the combination set forth in claim 8, means adapted for operation by said pedal for locking said control valve against movement when said pedal is operated in both ranges of movement.

11. In a motor vehicle having an engine, a clutch, a pedal for controlling said clutch and a change speed transmission, a shift rail in said transmission adapted for shifting from neutral to low and high speed driving positions respectively; a hydraulic motor for shifting said rail including a piston and a piston rod operably connected to said rail; a control valve for controlling said motor including a movable valve member operatively connected with said piston rod and so arranged that movement of said piston to high speed position urges said valve member to low speed position and vice-versa; a master valve for controlling admission of pressure fluid to said control valve, said master valve including a movable plunger operably connected with said clutch pedal for operation thereby and arranged such that operation of said pedal to release said clutch closes said master valve; and lock means operably associated with said valves for locking said control valve member against movement in response to operation of said plunger accompanied by release of said clutch.

DAVID A. WALLACE.
EDWARD C. LEE.